United States Patent [19]

Clapp et al.

[11] Patent Number: 4,562,466
[45] Date of Patent: Dec. 31, 1985

[54] DIGITAL DATA TRANSMISSION/RECEPTION HAVING ADAPTIVE ERROR CONTROL

[75] Inventors: Craig S. K. Clapp, Bracknell; Norman L. Shilston, Maidenhead, both of England; Jean-Claude R. Jolivet, Lannion; Daniel P. Devimeux, Perros Guirec; Armand Riou, Lannion, all of France

[73] Assignee: British Telecommunications, London, England

[21] Appl. No.: 516,707

[22] Filed: Jul. 25, 1983

[30] Foreign Application Priority Data

Jul. 23, 1982 [GB] United Kingdom ............... 8221406

[51] Int. Cl.⁴ ............................................. H04N 7/12
[52] U.S. Cl. .................................... 358/133; 358/136
[58] Field of Search ............... 358/133, 135, 136, 260

[56] References Cited

U.S. PATENT DOCUMENTS 3,937,871  2/1976  Robinson ..................... 358/135 X
4,060,832 11/1977  Devimeux et al. ............. 358/133
4,185,303  1/1980  Mounts et al. ................ 358/135 X
4,262,309  4/1981  Yamaguchi et al. ............ 358/260

Primary Examiner—Howard W. Britton
Assistant Examiner—Victor R. Kostak
Attorney, Agent, or Firm—Cushman, Darby & Cushman

[57] ABSTRACT

A conditional replenishment video data transmission system involves the transmission of updating digital data for clusters of consecutive picture elements, all or most of which show a change since the previous frame, in lines of a raster over an image to be transmitted. The lines of the raster are numbered cyclically in groups of 8, the numbers being part of line synchronizing code words, and the position along a line of the first element of each cluster is identified by a number. The data are transmitted at a constant rate from a transmitter buffer to a receiver buffer and an auxiliary data store records the addresses of the line synchronizing code words in the receiver buffer. The address of the receiver buffer read by a reading means can be corrected by reference to the address data in the auxiliary storage means if for example the line numbers do not follow in sequence or the element addresses are not in ascending order due to corruption during transmission. Alternatively, the reading means may be controlled at all times by the address data in the auxiliary storage means and not only when a tracking error has occurred. The tracking of the received data in the receiver buffer by the reading means may show a consistent error relative to the position predicted by the assumed transmission delay time; preferably such tracking errors are corrected by a whole frame jump using a receiver buffer of more than one frame capacity.

17 Claims, 5 Drawing Figures

DIGITAL DATA TRANSMISSION/RECEPTION HAVING ADAPTIVE ERROR CONTROL

This invention relates to data transmission and is especially, but not exclusively, useful in the transmission of video information employing conditional replenishment.

This application is related to the commonly assigned copending Carr et al U.S. application Ser. No. 515,497 filed July 20, 1983.

A television frame typically contains about 200,000 picture elements, and if the data are to be sent digitally desirably 8 bits should be provided to convey the brightness information at each element. With a frame repetition frequency of 25 per second for a moving picture, digital transmission on the above basis would call for a transmission channel capacity of 40 M bit/s. This requirement can be reduced considerably by making use of the high correlation between one frame and the next which arises because usually only a small portion of the picture will be moving at any one time. Conditional replenishment involves the transmission of only the changes to an accuracy of only, say, 16 nonlinearly distributed quantising levels from one frame to the next and the resulting data reduction is normally greater than the additional data which must be sent to identify accurately the particular areas of the frame to which the changes relate. The areas are identified by line number and picture element address along the line; although 9 bits are necessary to identify the line number completely a saving is made by using only 3 bits giving the number modulo 8. A field synchronising code is sent to identify the first line of a field and so are all line numbers whether there is a change in the line or not. The rate of data transmission needed using conditional replenishment varies considerably because it depends on the amount of the frame which is moving at the particular time, whereas it is much more convenient to have a constant data transmission rate. In order to overcome this difficulty buffer stores are provided at both ends of the transmission channel, and it is important that these buffer stores neither become empty nor overflow. Using this technique it has proved possible to transmit a moving picture satisfactorily over a 2 M bit/s channel.

If $B_E(t)$ is the number of bits stored in the encoder buffer (termed the encoder state) at the transmission end of the channel at a time t and $B_D(t)$ is the number of bits stored in the decoder buffer at the reception end of the channel at time t, it can be shown that $$B_E(t-\Delta t) + B_D(t) = V_R \cdot \Delta t$$

where $V_R$ is the transmission capacity (in bit/s) of the channel and is assumed to be constant and $\Delta t$ is the time delay between data entering the encoder buffer store and them leaving the decoder buffer store. Normally an optimum value for $\Delta t$ is chosen which makes the total of the data stored in the buffers equal to half of the total available buffer memory, and the control of the decoder buffer is based on the state of the encoder buffer at a time $\Delta t$ earlier. This means that the emptying and overflowing of the decoder buffer can be anticipated and appropriate action taken, either temporarily suspending decoding or discarding data, so that the corruption of the reproduced picture resulting from data suddenly being not available or being lost can be avoided.

Since the replenishment data is derived from an image scanned by a conventional television raster and the reproduced image is updated from the replenishment data line by line of a similar raster, it follows that the reading of data from the decoder buffer must remain in track with the writing of data into the encoder buffer if changes in the first image are to appear accurately in the reproduced image. This forms an additional constraint on the reading from the decoder buffer and is handled by transmitting the encoder buffer state $B_E(t)$ to the decoder so that the decoder buffer state $B_D(t)$ can be predicted on the basis of the equation given above.

However, channel transmission errors can cause the decoder buffer state to depart from that predicted by the encoder buffer state for one or more of the following reasons:

1. The value of $B_E(t)$ was corrupted during transmission giving a false prediction for $B_D(t)$.
2. The output of the decoder buffer is out of track with the video address due to channel errors causing simulation of or corruption of synchronising words.
3. $\Delta t$ is not of the optimum value due to the decoder being switched from one data source to another or to the occurrence of a non-synchronous cut in the video input of the encoder.

When a tracking error due to either of reasons 2 or 3 above has occurred corruption of the picture will continue until correct tracking is restored, so that it is clearly desirable to do this as quickly as possible. The corrective action required is somehow to find the exact address in the decoder buffer where the data corresponds to the current video address (or at least the current line) and switch to it.

It is an object of the present invention to provide a data transmission system of the above type in which tracking errors can be rapidly corrected.

According to the present invention there is provided a digital data transmission system having a source of data at an uneven rate, the data including a plurality of marker signals, a first buffer store for the data from the source, means for transmitting the data from the first buffer store at a constant rate to a transmission path, means for receiving the data from the transmission path and applying them to a second buffer store, means for reading the data from the second buffer store at an uneven rate, and a utilisation means using the data from the second buffer store, wherein the receiving means includes auxiliary data storage means, means for storing in the auxiliary data storage means the addresses of the second buffer store in which the marker signals are stored, and means for determining the address used by the reading means by reference to the addresses stored in the auxiliary data storage means.

The receiving means may include means for detecting when the reading means is apparently reading data from an incorrect address of the second buffer store and for correcting that address from the information stored in the auxiliary data storage means.

The invention is of particular value in the transmission of conditional replenishment data for an image, in which case the marker signals could be field synchronisation code words and line synchronisation code words together with line number information, these being derived from a conventional television scanning raster from which the image data are derived. The auxiliary data storage means may store indications of the type of synchronising word and of the line number together with their addresses in the second buffer store. The first buffer store is the encoder buffer and the second buffer store the decoder buffer of the system described above.

The data may conveniently be transmitted in a conventional framing structure, such as that known as CCITT G732, but because of the variable rate of the source data, the data will be asynchronous to the framing structure.

The control of the read addresses of the second buffer store may be effected at all times and not just when a tracking error has occurred by reference to the information stored in the auxiliary data storage means.

The receiving means may be arranged to search the incoming data for the line synchronisation and field synchronisation code words. Transmission errors can cause these words to appear spuriously or disappear, and the receiving means may have means for assessing the validity of a line synchronisation word, which is accompanied by a modulo 8 line number, by keeping track of the line numbers. If the line numbers do not appear in the correct cyclic sequence this can be taken as an indication of a missing or a spurious line synchronisation word. Another check which can be made in such circumstances is on the addresses along a line where changes are required; these addresses should also occur in ascending order. If an apparently valid line synchronisation word and line number occur which do not agree with the line number record kept by the receiving means a loss of tracking is assumed to have taken place and corrective action is instituted.

The line number sequence may also be used to predict the time of reception of a field synchronisation word, unless such prediction is unreliable because the preceding field synchronisation word did not appear when expected.

The picture elements along a line at which changes are to be made may be formed into one or more clusters of consecutive elements for transmission. A cluster may include a few points where no change is required so as to reduce the number of clusters and therefore also the number of cluster addresses.

The tracking may be adaptive so as to accommodate errors in the time Δt. This may be achieved by adjusting the length of the field blanking period thereby altering the time of the start of the next video field. Disturbance of the picture can be avoided by making corresponding changes to the number of lines in the field, which changes would not be noticed on a monitor display. However, such changes can upset the operation of a video recorder or other video processing equipment. This difficulty can be overcome by making the adjustments, when they are required, of a complete video frame period so that the synchronisation words occur without gaps. This requires the second buffer store to have sufficient capacity to store data for about two frames. The adjustments amount to repeating of a frame and discarding of a frame and would not be subjectively objectionable. There will be some replenishment errors in the case of frame discard, but the infrequency of their occurrence will make them tolerable.

In order that the invention may be fully understood and carried into effect it will now be described with reference to the accompanying drawings, of which:

Figure 1:
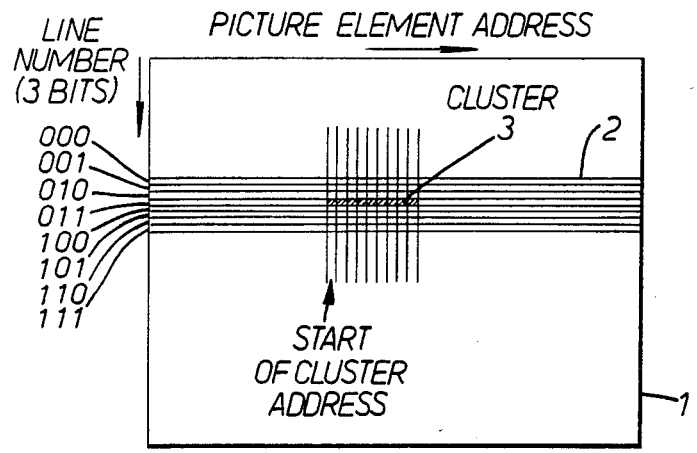
FIG. 1 is a diagram to be used in explaining how the picture elements which have changed are identified.

In FIG. 1, the rectangle 1 represents the image area of a television picture and 2 represents a group of eight consecutive lines of the picture. The eight lines are given line numbers modulo 8 so that the number can be represented by a group of 3 bits from 000 to 111 as shown. Along each line the picture elements are given addresses depending upon their position along the line, there being 256 elements in each line. A cluster 3 of elements in the line 011 is indicated and it is assumed that these elements have undergone a change since the preceding frame. The elements forming the cluster 3 are identified by the line number 011 and the address of the start of the cluster. Once this information has been provided, the changes to the elements are presented sequentially using variable length Huffman codes. At the end of the cluster an end of cluster code appears.

If the transmitter and receiver have picture stores recording in digital form the brightness of the elements, which elements are scanned in conventional television manner in synchronism with the other picture store, then the data relating to changes in element brightness can be transmitted from one picture store to another so that the receiving picture store reproduces the information in the transmitter. Of course this data will require line and field synchronising code words to ensure that the scanning of the two picture is in synchronism. The line synchronising code words also include the 3-bit line number. The field synchronising code words are of two types identifying the odd and even fields of the normal interlaced scan.

Figure 2:
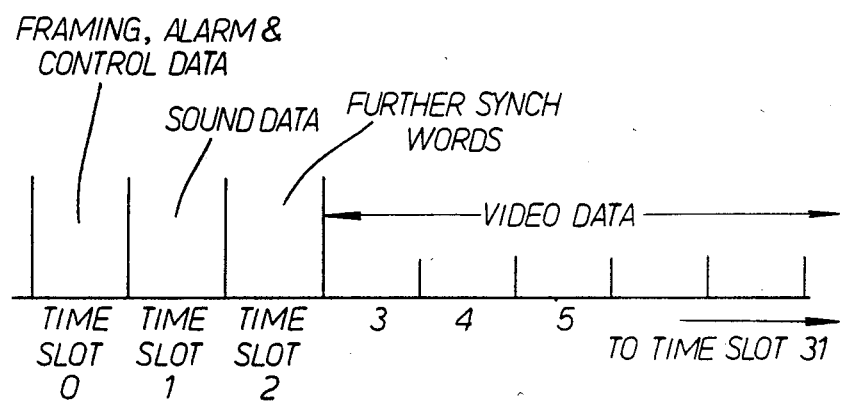
FIG. 2 is a diagram showing the framing structure used for transmitting the data.

The data to be transmitted from the transmitter to the receiver is included in a conventional CCITT G732 framing structure. As shown in FIG. 2, this structure consists of 32 serial 8-bit time slots which form a frame. Sixteen of such frames form a multiframe. Time slot 0 of odd frames include a frame synchronising word for the framing structure in the form of a Barker sequence, together with one bit which forms with the single bits of other odd time slot 0's a Barker sequence over a multiframe, so that the timing of the framing structure can be recognised by the receiver. Alarm and control information is transmitted in the even time slot 0's. Sound data and further synchronising words appear in time slots 1 and 2. The remaining 29 time slots in each frame are filled with the video data including the line and field synchronising code words representing the changes to be transmitted from the transmitter picture store to the receiver picture store. As the amount of a picture which is moving at any one time is variable so the amount of data to be transmitted from the transmitter picture store to the receiver picture store will vary, but this data may be sent so as to keep the data in the receiver picture store substantially the same as the data in the transmitter picture store. In other words, the amount of data which has to be sent in one field scanning time varies with the amount of movement in the picture, and consequently the video data is asynchronous with the frame structure of the G732 format signal in which it is carried.

Because of the variation in the video data rate, it is necessary to provide both encoder and decoder buffers respectively at the transmitter and receiver so that a constant rate of transmission can be used between transmitter and receiver.

In addition, four techniques are used to reduce the extremely high rate of video data which might otherwise occur when there is a lot of picture movement. These four techniques are:
  (1) The sensitivity of the movement detector at the encoder is reduced as the encoder buffer fill increases so that the number of areas of detected picture change is reduced.
  (2) Field sub-sampling on a time basis is introduced. In this technique alternate fields of information are discarded and the decoder is operated so as to interpolate the missing information from the two adjacent transmitted fields.
  (3) Sub-sampling on an element basis is introduced so that certain moving area elements are discarded by the encoder and interpolated by the decoder.
  (4) If the above techniques fail to prevent imminent overfill of the encoder buffer, then all movement of the transmitter picture is ignored until the encoder buffer state has returned to a safe value.

Figure 3:
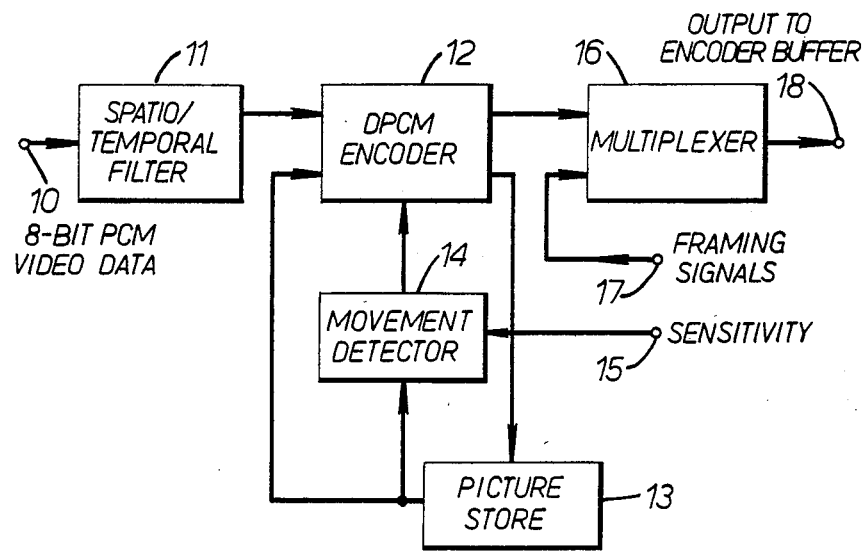
FIG. 3 is a block diagram of an encoder suitable for producing a conditional replenishment video signal.

FIG. 3 shows in block diagrammatic form a suitable encoder in which 8-bit PCM video data representing the picture to be transmitted is applied via a terminal 10 to a spatio/temporal filter 11 which processes the image by spatial non-linear filtering and noise reduction to improve the performance of the subsequent movement detector. The output of the filter 11 is applied to a DPCM encoder 12 where the incoming data is compared with that stored in a picture store 13. The encoder includes a movement threshold set by a movement decoder 14 in response to a sensitivity control signal applied to a terminal 15. The encoded data is applied to a multiplexer 16 where it is combined with framing signals applied via terminal 17 to produce an output on terminal 18 which is fed to an encoder buffer store.

The encoding is based on the difference between the actual picture element brightness and a predicted brightness for the element derived either from a corresponding element in the previous frame or from adjacent elements in the same field.

Figure 4:
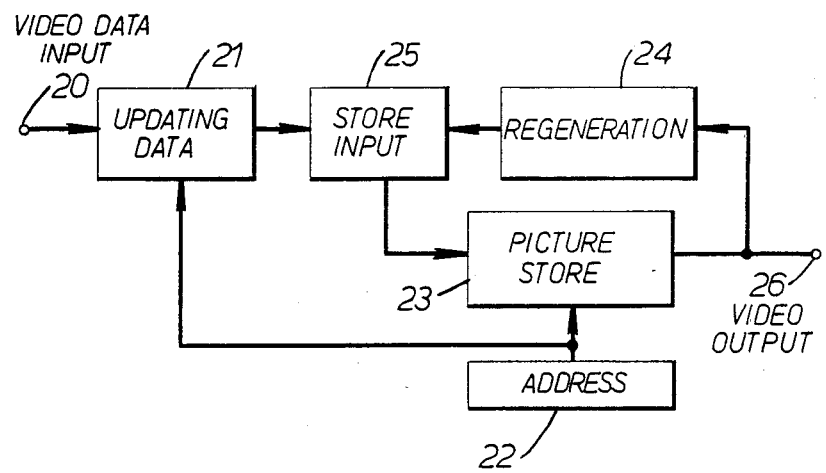
FIG. 4 is a block diagram of a decoder for regenerating a television signal from conditional replenishment video data.

At the receiver, the video data is decoded by a decoder of the type shown in FIG. 4 where the incoming data on terminal 20 is applied to an updating data store 21 which is addressed by an address unit 22. The unit 22 also addresses the decoder picture store 23 and the values read out from the addresses of the store 23 are applied via regenerating circuits 24 to store input circuits 25. If the particular element address is to be changed, then the updating data from the store 21 is applied to the input 25 at the same time as the data is read out from the store 23 into the input 25. In the input circuits 25 the element value is adjusted in accordance with the incoming data and re-entered into the store 23. A video output appears at a terminal 26 as the store 23 is sequentially addressed. The adjustments to the decoder required by the use of the four different techniques described above for reducing the peaks in the video data rate are not shown but can be accommodated by suitable modification of the store input circuits 25.

Figure 5:
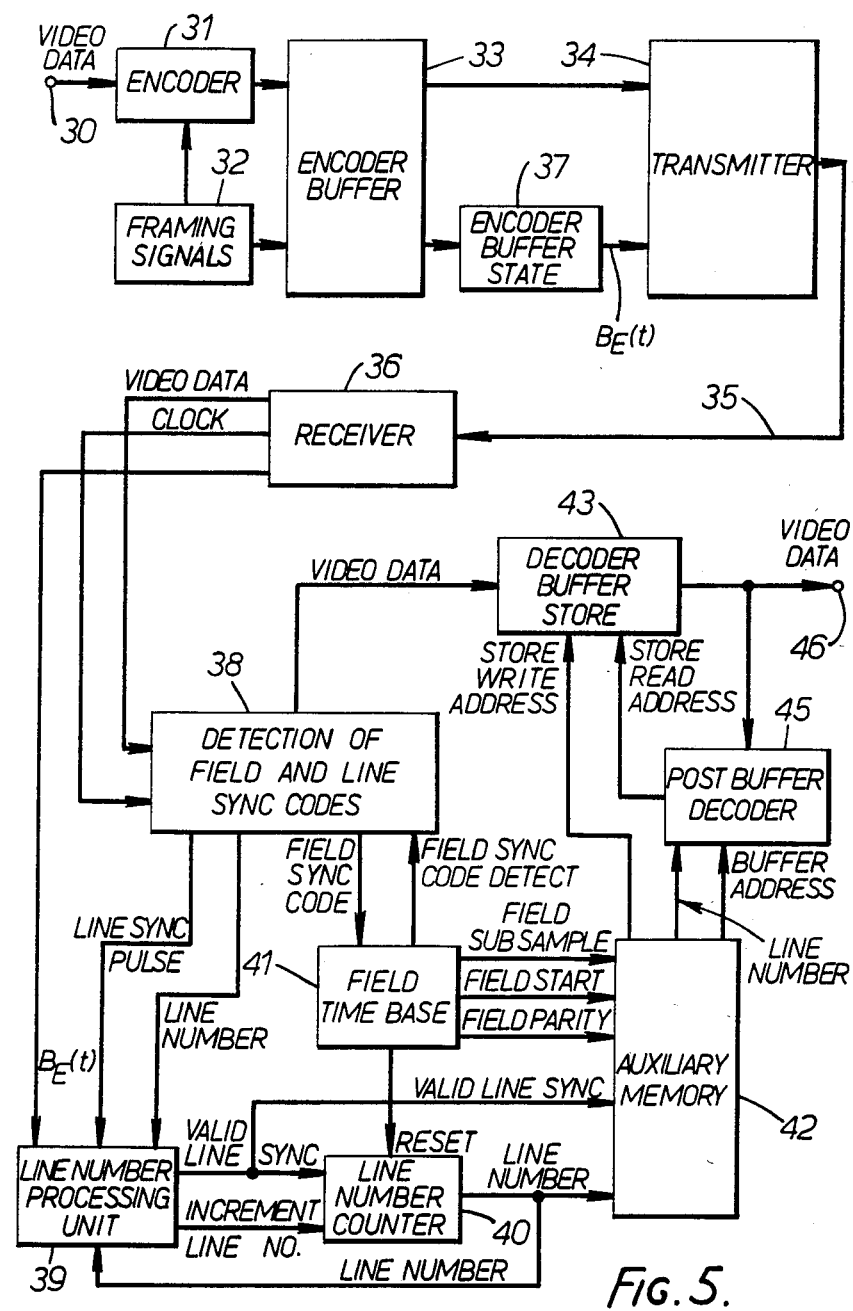
FIG. 5 is a block diagram of a data transmission system according to one example of the present invention suitable for handling conditional replenishment video data.

The operation of the circuits shown in FIGS. 3 and 4 to handle the transmission of video data as described above is satisfactory unless errors occur in the data transmission from the transmitter to the receiver which interfere with the correct synchronisation of the updating of the picture stored in the receiver with the transmission of the updating data from the transmitter. Errors in the transmitted data can cause the appearance of additional line synchronising code words or the disappearance of such words and when this occurs the updating video data will be used to corrupt elements of the display instead of correcting other elements. The present invention seeks to overcome this and some related problems by providing a decoder ahead of the decoder buffer store, which decoder effectively looks ahead at the stream of data reaching the receiver and reaches a decision on the validity of a line synchronising code word on the basis of the previously occurring line synchronising words and those following it. An example of a system using the invention is shown in FIG. 5 where incoming video data in the form of 8-bit PCM words representing the brightness of picture elements are applied via a terminal 30 to an encoder 31. The function of the encoder 31 is to produce the conditional replenishment data for the picture and framing signals from a unit 32 are used to complete the video data for transmission which is stored in an encoder buffer 33. A transmitter 34 transmits the data via a transmission path 35 to a receiver 36. Along with the video data there is also transmitted to the receiver the encoder buffer state $B_E(t)$ which is derived from the buffer 33 by a unit 37. The pre-buffer decoder consists of a unit 38 for detecting the field and line synchronising code words, a line number processing unit 39, a line number counter 40, a field time base 41 and an auxiliary memory 42. Signals from the pre-buffer decoder are applied to a decoder buffer store 43, the output of which appears at a terminal 44 and is also applied to a post-buffer decoder 45. Terminal 44 is connected to the input 20 of FIG. 4.

The receiver 36 applies to the unit 38 the video data and a clock signal. When the unit 38 detects a line synchronising code word, it applies a signal to the line number processing unit 39 indicating the occurrence of the word and it also sends to that unit a 3-bit binary number which is the line number modulo 8 and forms part of the line synchronising code word. The receiver 36 sends the encoder buffer state $B_E(t)$ directly to the line number processing unit 39. The unit 39 performs a number of operations on the data sent to it and one function of the unit is to validate the line synchronising word in a manner to be described. If the unit 39 decides that the line synchronising word is valid then it applies a signal to the line number counter 40 indicating that it is a valid word and it also causes the line number counted by the counter 40 to be incremented by 1. In one example of the invention, there are 286 lines in a field and the counter 40 is arranged to count from 0 to 285 and then return to 0 again. The field time base 41 receives from the detecting unit 38 a signal when a field synchronising code word is detected. The time base 41 keeps track of the expected time of occurrence of a field synchronising word and when one is expected it applies a signal to the unit 38 to alert it to the likely occurrence of such a word. The time base 41 also resets the line number counter 40 to zero. The auxiliary memory 42 which includes means for determining the write address of the buffer store 43 stores the addresses in the store 43 of the start of a field and the start of each line together with its full line number. In addition, the memory 42 stores an indication of whether field sub-sampling is in use to reduce the data rate from transmitter to receiver as mentioned above. The post-buffer decoder 45 which includes means for generating the read address for the buffer store 43 is arranged to receive line numbers and corresponding buffer addresses from the memory 42, so that if need be the read address for the store 43 can be switched to the start of a particular line of the video data stored in the store 43.

In normal operation, the pre-buffer decoder merely keeps track of the location in the store 43 of the start of each field and start of each line within a field. When a particular line of video data is read out from the store 43 by the decoder 45, the memory 42 is arranged to delete the record relating to that line number from its stored data.

As mentioned above, each line synchronising word includes the modulo 8 line number of the video line to which it relates. In validating line synchronising words, the unit 39 seeks to maintain the correct line number sequence by discarding spurious additional line synchronising words and by redefining the line numbers and those whose line number appears corrupted as indicated by the preceding and following line synchronising words. When line synchronising words are so badly corrupted as not to be detected, this will be apparent from a gap in the line number sequence and whilst this error will result in the partial corruption of one line of video data, the re-establishment of the corrected line number sequence will avoid a large area of corruption. Further indication of the correctness of the assumption of the missing line synchronising word may be obtained from the associated video data by looking for coding violations which could result from such an occurrence such as a downward change in the cluster address without a preceding line synchronising word. The unit 39 may include a microprocessor circuit programmed to perform the necessary checks on the line numbers and, if desired, also the cluster addresses. The operation of the line number counter 40 is that it counts in synchronism with the line numbers of the incoming video data and the unit 39 also checks that the two number sequences are in synchronism with each other.

Although the data stored in the auxiliary memory 42 is used in this example to enable the rapid correction of the reading address of the buffer store 43 when the post-buffer decoder 45 detects that the reading point is out of track with the scanning of the picture store to which the video data is fed, the decoding point can alternatively be forced to the address given by the auxiliary memory at the end of every video line so that the post-buffer decoder 45 is not required to determine whether or not the reading point is in track with the data.

As mentioned above, the state of the decoder buffer 43 is related to that of the encoder buffer by the equation $$B_E(t - \Delta t) + B_D(t) = V_R \cdot \Delta t$$

where $V_R$ is the transmission capacity of the path 35 and $\Delta t$ is the time between data entering the encoder buffer store and it leaving the decoder buffer store. From this equation it is possible to predict the state of the buffer store 43 and the pre-buffer decoder may include means for monitoring the actual state of the store 43 and comparing it with the value predicted by the equation. If over a period of time the state of the store 43 is consistently too high or too low, this would indicate an error in the assumed value of $\Delta t$. If the buffer 43 consistently contains too much information, then the start of the next video field can be advanced by a few lines by shortening the field blanking period. On the other hand, if the buffer is too empty, then the field blanking may be lengthened, thereby delaying the start of the next field. Normally, the number of lines of advancement or delay would be limited to a maximum of three lines with one line being the preferred value. Disturbance of the picture resulting from this field synchronising adjustment is possible if the picture store is in the form of a variable length shifting register and this has been found to perform quite satisfactorily when the video output is displayed on a monitor. However, video recorders are less tolerant to such disturbances as may other video processing equipment be if the rate of change of field frequency needs to be of a very low value. Another disadvantage of this arrangement is that the correction is slow so that switching of a receiver from one transmitter to another could mean that a long period of time is required for the receiver to lock to the new source of video data.

It has been found in practice that the decoder buffer store 43 should have a larger capacity than the encoder buffer store 33 to allow for small departures of $\Delta t$ from the value it should have for the buffer stores to be exactly half full when the decoder output is exactly in track without causing buffer underflow or overflow. The greater the difference between the sizes of the buffers the greater the variation of $\Delta t$ which can be accommodated. If the decoder buffer store 43 is made sufficiently large as to be able to accommodate rather more than a complete video frame period, then $\Delta t$ can be changed by an entire frame at a time when adjustment of its value is required as described above, and in this way there would be no discontinuity in the field and line synchronising code words. To increase $\Delta t$ by 40 ms, the reading of the store 43 would be inhibited for this period which would causes the same video frame to be displayed twice. To decrease $\Delta t$ by 40 ms, a complete frame of data would be discarded from the store 43 so that there would be a slight jump in the reproduced picture. Discarding of the data causes some replenishment errors, but it is believed that these would not be unacceptable bearing in mind the likely frequency of occurrence of the effect. In systems where the receiver is switched among a number of different transmitters such as might be provided for a conference arrangement with several participants, it is possible to ensure that corrections to the value of $\Delta t$ which occur after switching from one data source to another are only of the frame repeat variety and do not involve a frame discard. This would be done by ensuring that the encoder buffer of the source being switched to is as empty as possible before it is selected as a data source. In this way, the decoder buffer will appear to be too empty at the time of the switching and the only likely effect of $\Delta t$ being too short in this way is that a frame repeat will occur.

In order to determine whether a frame repeat or a frame discard should take place, there are two alternative procedures. In the first of these the value of $\Delta t$ is ascertained and compared with the theoretical required value for the decoder to be in track. When the difference between these values is sufficiently in excess of $\pm 20$ ms, a frame repeat or frame discard as appropriate is effected at the next field synchronising code word. The value of $\Delta t$ is ascertained by an iterative process which may be performed by the microprocessor in the unit 39. In this process an initial value for $\Delta t$ is guessed and the sum $B_E(t - \Delta t) + B_D(t)$ is evaluated for several samples of the states of the buffer. The largest and smallest sums are discarded because they may contain extreme errors and the average of the remaining sums is compared with the expected value of $V_R \cdot \Delta t$ using the guessed value of $\Delta t$. The imbalance between the two sides of the equation indicates the nature of the error in the guessed value of $\Delta t$ which can then be incremented or decremented to produce a closer result.

When the true value of $\Delta t$ has been ascertained, the microprocessor in the unit 39 may take on the additional task of field sub-sample verification. As mentioned above, the field sub-sampling is used to reduce data rate and is signalled by a modification of the field synchronising word. However, a corruption of this word can mean that the decoder continues to operate normally when field sub-sampling is in progress. During a sub-sampled field the state of the encoder buffer should fall steadily as data is fed from it over the transmission path and no new data is entering the buffer. The microprocessor examines the value of $B_E(t)$ for this trend to determine whether or not field sub-sampling is in process. Again, the microprocessor program should be arranged to allow for the possibility of errors in the values of the encoder buffer state.

The alternative process for deciding whether to perform a frame repeat or a frame discard is to compare the actual state of the decoder buffer with that predicted by the equation given above using the theoretically correct value for $\Delta t$. If the difference between the actual and the predicted state of the decoder buffer exceeds a predetermined threshold corresponding to a change in $\Delta t$ of greater than $\pm °ms$, then a frame repeat or frame discard as appropriate is carried out. So as to avoid the effect of errors in the data, the calculation should be repeated a number of times before the actual frame repeat or frame discard operation is executed. This process does not result in the determination of the value of $\Delta t$ so that it cannot provide the additional facility of verifying the presence of field sub-sampling.

Although the invention has been described with reference to a specific type of signal, it can be applied to any signal having suitable marker signals.

What we claim is:

1. A method of achieving adaptive error control in the transmission and reception of conditional replenishment digital video data, said method comprising the steps of:
   generating and transmitting conditional replenishment digital video data including line and frame synchronization control data which includes consecutively ordered line address indicia and consecutively ordered picture element address indicia along a given line in a predetermined raster scanning sequence for a given video image frame;
   receiving said data and pre-processing it to detect the expected consecutively ordered occurrences of said indicia;
   further processing said received data if the expected consecutively ordered occurrences are not detected so as to compensate therefore; and
   updating a video image display using said further processed received data.

2. A method for adaptive error controlled reception of conditional replenishment digital video data which includes consecutively ordered line and picture element address data in a predetermined raster scanning sequence, said method comprising the steps of:
   receiving said data and pre-processing it to detect the expected consecutively ordered occurrences of said address data;
   further processing said received data if the expected consecutively ordered occurrences are not detected so as to compensate therefore; and
   updating a video image display using said further processed received data.

3. Apparatus for adaptive error controlled reception of conditional replenishment digital video data which includes consecutively ordered line and picture element address data in a predetermined raster scanning sequence, said apparatus comprising:
   means for receiving said data and pre-processing it to detect the expected consecutively ordered occurrences of said address data;
   means for further processing said received data if the expected consecutively ordered occurrences are not detected so as to compensate therefore; and
   means for updating a video image display using said further processed received data.

4. A digital transmission system having:
   a source generating data at an uneven rate, the data including a plurality of marker signals,
   a first buffer store for temporarily storing data from the source,
   means for transmitting the data from the first buffer store at a constant rate to a transmission path,
   means for receiving the data from the transmission path including a second buffer store and means for applying said received data to said second buffer store,
   means for reading the data from the second buffer store at an uneven rate, and
   a utilization means using the data from the second buffer store,
   wherein the marker signals include indicia in a predetermined cycle and the receiving means includes auxiliary data storage means,
      means for storing in the auxiliary data storage means addresses of the second buffer store in which the marker signals are stored, and
      detecting and correcting means having counting means for following the predetermined cycle of the indicia in the marker signals, means for comparing the indicia recorded by the counting means with the indicia in the marker signal received at the time, and means responsive to a non-zero output from the comparing means to correct the address used for the second buffer store from the information stored in the auxiliary data storage means.

5. A system according to claim 4, wherein the data include conditional replenishment data for an image, the marker signals which are line synchronization code words with line number information, and field synchronization code words, and the receiving means includes time base means for predicting the times of reception of field synchronization code words by reference to the line indicia in the marker signals, the counting means being reset to a datum value in response to an output from the time base means.

6. A digital data transmission system having:
   a source generating data at an uneven rate, the data including a plurality of marker signals,
   a first buffer store for temporarily storing data from the source, means for transmitting the data from the first buffer store at a constant rate to a transmission path, means for receiving the data from the transmission path including a second buffer store and means for applying said received data to said second buffer store, means for reading the data from the second buffer store at an uneven rate, and a utilization means using the data from the second buffer store, wherein the receiving means includes auxiliary data storage means, means for storing in the auxiliary data storage means addresses of the second buffer store in which the marker signals are stored, and means for determining the address used by the reading means by reference to the addresses stored in the auxiliary data storage means.

7. A system according to claim 6 wherein the marker signals include indicia following a predetermined cycle.

8. A system according to claim 6 wherein the addresses of all marker signals are transferred from the auxiliary data storage means to the reading means to control the addresses used by the reading means.

9. A system according to claim 6 wherein the data are conditional replenishment data for an image and the marker signals are line synchronization code word with line indicia information, wherein the data represent picture elements along a line at which changes are to be made, the changes being formed into clusters relating to consecutive elements.

10. A system according to claim 9 wherein the data also include field synchronization code words and the receiving means includes time base means for predicting the time of reception of field synchronization code words by reference to the line numbers in the line synchronization code words.

11. A system according to claim 9 wherein the data includes for each cluster the element address along the line of the first element in the cluster, and the receiving means includes means for checking that the element addresses of clusters between consecutive line synchronizing code word has occurred.

12. A system according to claim 9 wherein the receiving means includes means responsive to the quantities of data in the first and second buffer stores to calculate whether the actual quantity of data in the second buffer store differs consistently from the quantity expected to be in that store on the assumption of a particular propagation delay time for the transmission path, the reading means being adjusted to tend to correct any consistent difference found by the responsive means.

13. A system according to claim 12 wherein the second buffer store can store more than a complete video frame period of data and the adjustment to the reading means involve discarding or repeating an entire frame of data.

14. A system according to claim 7 wherein the receiving means includes means for detecting when the reading means is apparently reading data from an incorrect address of the second buffer store and for correcting that address from the information stored in the auxiliary data storage means.

15. A system according to claim 14 wherein the detecting and correcting means responds to the indicia in the marker signals in the received data before being entered in the second buffer store.

16. A system according to claim 15 wherein the receiving means includes counting means for following the predetermined cycle of the indicia in the marker signals and means for comparing the marker signal indicia recorded by the counting means with the indicia in the marker signal being received at the time, a non-zero output of the comparing means providing an indication that a marker signal had been corrupted so as not to be recognized and that the address used by the reading means should be corrected.

17. A system according to claim 16 wherein the data also includes other marker signals and the receiving means includes means for predicting the times of occurrence of such other marker signals by reference to the position of the received marker signal indicia in the predetermined cycle.

* * * * *